United States Patent [19]

Greenspan

[11] Patent Number: 4,842,738

[45] Date of Patent: Jun. 27, 1989

[54] CENTRIFUGE DEVICE

[76] Inventor: Harvey P. Greenspan, 15 Chatham Cir., Brookline, Mass. 02146

[21] Appl. No.: 187,972

[22] Filed: Apr. 29, 1988

[51] Int. Cl.[4] .......... B01D 17/038

[52] U.S. Cl. .......... 210/380.1; 210/512.2; 55/346; 494/56

[58] Field of Search .......... 55/343, 345, 346; 209/144, 148, 151, 211; 210/378, 380.1, 512.2; 494/56

[56] References Cited

U.S. PATENT DOCUMENTS

| | | | |
|---|---|---|---|
| 491,501 | 2/1893 | Wahlin . | |
| 624,596 | 5/1899 | Williams . | |
| 927,059 | 7/1909 | Kuchs . | |
| 968,327 | 8/1910 | Christianson . | |
| 1,016,366 | 2/1912 | Sanford . | |
| 1,057,613 | 4/1913 | Baldwin . | |
| 1,216,118 | 2/1917 | Hering . | |
| 1,360,708 | 11/1920 | Avrutik . | |
| 1,565,236 | 12/1925 | Roth . | |
| 1,742,095 | 12/1929 | Perrier . | |
| 2,071,617 | 2/1937 | Daman . | |
| 2,767,841 | 10/1956 | Cram . | |
| 2,965,232 | 12/1960 | Vane | 209/211 |
| 2,967,618 | 1/1961 | Vane | 209/211 |
| 3,326,459 | 6/1967 | Leroux . | |
| 3,449,938 | 6/1969 | Giddings . | |
| 3,477,569 | 11/1969 | Klein et al. | 209/144 |
| 3,523,610 | 8/1970 | Purcell et al. . | |
| 3,901,799 | 8/1975 | Adkison | 209/144 |
| 3,925,045 | 12/1975 | Cheng | 55/345 |
| 4,066,536 | 1/1978 | Gall et al. . | |
| 4,147,621 | 4/1979 | Giddings . | |
| 4,153,541 | 5/1979 | Rumpf et al. . | |
| 4,214,981 | 7/1980 | Giddings . | |
| 4,250,026 | 2/1981 | Giddings et al. . | |
| 4,283,276 | 8/1981 | Grant . | |
| 4,285,810 | 8/1981 | Kirkland et al. . | |
| 4,414,106 | 11/1983 | Romanasuskas . | |

*Primary Examiner*—Charles Hart
*Attorney, Agent, or Firm*—Robert F. O'Connell

[57] ABSTRACT

A centrifuge device for separating different species of particles having different masses or sizes which are contained in a fluid medium, wherein the device comprises a plurality of adjacent channels positioned in a centrifugal field. The fluid medium flows through such channels and the channels are arranged such that portions of the fluid medium are successively diverted from one channel to the next in a cascaded manner. Accordingly, for separating particles of two different species, for example, portions of the fluid containing particles of one species and a fraction of the particles of the other species are so diverted in each case from one channel to the next adjacent one, while the remaining portions containing only particles of the other species continue to flow in the one channel. The particles in the channel, or channels, which then contain essentially only one specie and the particles in the channel, or channels, which contain substantially only the other specie can then be appropriately collected and made available at separate outputs.

9 Claims, 3 Drawing Sheets

CENTRIFUGE DEVICE

INTRODUCTION

This invention relates generally to devices for separating particles of different mass or size and, more particularly, to a centrifuge device for separating in a continuously flowing manner such particles as contained in a bulk mixture thereof.

BACKGROUND OF THE INVENTION

In many applications, it is desirable to separate particles having different masses or sizes, particularly where such particles are microscopic in size, such as in the separation of particles of different proteins contained in a solution thereof. Many particle separation/fractionation techniques operate by batch processing in which the solution is either static or does not flow in a truly continuous manner through the separation apparatus.

It is desirable to provide for higher separation throughput by separating the particles from a continuous flow of a bulk mixture thereof in solution, separate outputs being used to continuously supply particles having different masses or sizes.

BRIEF SUMMARY OF THE INVENTION

In accordance with the invention, a centrifuge device provides for a continuous inflow of a solution containing particle species having different masses or sizes and for the separation and fractionation of the individual particle species in the centrifugal field thereof. It is known that the sedimentation time of a particle in a centrifugal field decreases with increasing mass or size. In a steady, continuous flow of a mixture of fluid and particles in a direction parallel to the axis of rotation various particle species sette out of the mixture at different distances along the axial channel length. For purposes of illustration, it is assumed herein that all particles are heavier than the fluid medium itself. If flow in the centrifugal field of the device passes through a plurality of two or more concentric cylinders effectively in cascade, a portion of the outwardly directed fluid generally having the heavier or larger particle specie will be diverted from an inner cylinder channel to the next adjacent outer cylinder channel, while the remaining portion of the fluid having the lighter or smaller particle specie will be retained within the inner cylinder channel In a particular embodiment, for example, for separating two different particle species, when using two concentric cylindrical channels a portion of the fluid medium containing substantially all of the heavier or larger particle specie will tend to be diverted to the outer one of the two channels through an opening between the channels at a selected location along the channels but such portion will tend to carry with it some of the lighter or smaller particle specie. The remaining portion of the fluid medium will continue to flow within the inner channel and carry with it most of the lighter or smaller particle specie.

If an additional outer concentric channel is utilized, a portion of the fluid medium containing the heavier or larger particle specie previously diverted into the first outer channel will again be diverted into the additional outer channel through an opening at another selected location along the channel, while most of the lighter or smaller particle specie will continue to flow in the first outer channel, although again some of the lighter or smaller particles may tend to be diverted into the additional outer channel along with the heavier or larger particles. If still further outer concentric channels are added in cascade to the structure, with appropriate openings at other locations along the channels, similar diversion operations will operate in substantially the same manner, there being fewer of the the lighter or smaller particles remaining to be diverted in each case from one channel to the next adjacent outer channel.

Following a number of such cascaded diversion operations, substantially all of the heavier or larger particle species will be contained in and flow through the outermost channel while the lighter or smaller particle species will be contained and flow in the other channels, the latter being appropriately collected into a single output channel to provide an output stream thereof. As a result the device will provide at its output two purified streams of particles each containin a different particle specie.

Such operation can be extended for use in the simultaneous separation of several different particle species in the same solution. A further advantage is that the overall structure can be readily hermetically sealed if exposure to the atmosphere is to be avoided during the separation and fractionation operation.

DESCRIPTION OF THE INVENTION

The invention can be described in more detail with the help of the accompanying drawings wherein FIG. 1 shows in diagrammatic form a portion of a particular exemplary embodiment of a centrifuge device in accordance with the invention for separating two particle species;

Figure 1:
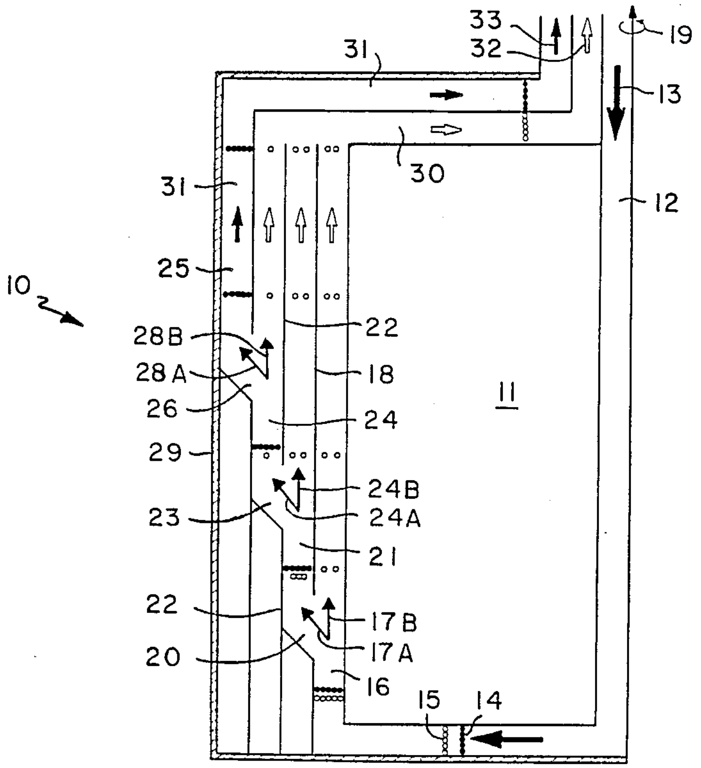

FIG. 1 shows a portion of a centrifuge device 10, in effect showing one-half of the device for purposes of simplicity As can be seen a cylinder 11 (one-half of which is effectively shown) has a central inflow channel 12 into which a fluid medium, such as a liquid solution, is introduced (arrow 13), such fluid medium including, for example, a mixture of particles of two different particle species. Such particle species are shown diagrammatically by particles 14 and 15. In the particular embodiment discussed, particles 14 are heavier, or larger, than particles 15 and it is desired to separate particles 14 from particles 15 in the centrifuge device 10.

For purposes of illustration, all particles are here assumed to be heavier than the liquid in which they are immersed. The particles flow into a first cylindrical separation channel 16 positioned adjacent to the outer surface of cylinder 11 the input pressure causing the solution to flow upwardly through channel 16. Channel 16 is formed by a concentric shell 18 enclosing the outer surface of cylinder 11. The shell 18 can be mounted as by using suitable spacer elements (not shown) as would be well-known to, and within the skill of, those in the art.

As the particles flow upwardly through cylindrical channel 16 they are subject to a centrifugal field which is generated by the high speed rotation of cylinder 11 about a rotation axis shown by arrow 19. Under the influence of such centrifugal field, larger particles 14, or particles 14 having greater mass, will settle faster in Channel 16 (towards cylinder 18) than smaller particles, or particles having less mass. Accordingly, substantially all of the particles 14 tend to be diverted through an opening 20 located at a selected position along channel 16 into a second channel 21, as shown by arrow 17A, formed by a concentrical cylindrical shell 22, while a significant portion of the particles 15 tend to be retained so as to flow separately in channel 16, as shown by arrow 17B. However, some fraction of the total number of the particles 15 entering channel 16 will tend to be diverted into channel 21 along with the heavier particles 14 as shown.

An opening 23 is provided at a selected location along channel 21 for the further diversion of particles into another further outwardly positioned concentric channel 24. At the opening 23, the particles 14 flowing in channel 21 will again be diverted, this time into channel 24, as shown by arrow 24A, together with another fraction of the lighter particles 15, while the bulk of the lighter particles in channel 21 will be retained therein and flow upwardly therein, as shown by arrow 24B. Further particle specie separation can be achieved by utilizing still another outer concentric channel 25 and an opening 26 at a selected location along channel 24 so that the particles 14 are again diverted into channel 25 as shown by arrow 28A, while the rest of particles 15 remain in channel 24 as shown by arrow 28B. Channel 25 is formed by the use of another concentric cylindrical shell 29 which also forms the outer surface of the overall device in the particular embodiment shown. It is clear that a large number of concentric channel can be used to form the internal cascading of the flow diversion operation, depending on the degree of separation desired for the particular particles involved.

If a sufficient number of concentric channels are utilized in this manner in the overall system, it is found that substantially all of the heavier or larger particles will be diverted so as to flow in the outermost concentric channel (e.g., channel 25 in the embodiment shown), while different fractions of substantially all of the lighter or smaller particles will flow through different ones of the inner channels (e.g., channels 16, 21 and 24 in the embodiment shown). The latter particles can be collected so as to flow continuously through a single outflow channel 30, the heavier particles being continuously supplied via the outflow extension 31 of outermost channel 25, as shown by arrows 32 and 33, respectively.

In general, if a fraction, r, (where r is $<1$) of the total number of incoming lighter or smaller particles is removed each time a flow of particles is diverted through an opening, or slot, between adjacent channels, after n diversion operations the concentration of the lighter particles in that portion of the stream which in each case contains the heavier particles will be reduced by a factor of $r^n$. Thus, for example, if r equals 0.6 and n equals 30 (e.g., it is assumed that 60% of the lighter particles are separated from the heavier particles at each diversion and there are 30 diversion operations), the concentration of lighter particles in the heavier particle final output stream will be reduced by $2.2\times10^{-7}$. Thus, an extremely high degree of purification can be attained if a relatively large number of diversions of the particle streams are employed in the internal cascade operation.

As can also be seen by the configuration used, the flowing medium is effectively hermetically sealed from the atmosphere during the separation process and, in some uses, such hermetic sealing may be of great importance when dealing with certain particle species.

Figure 2:
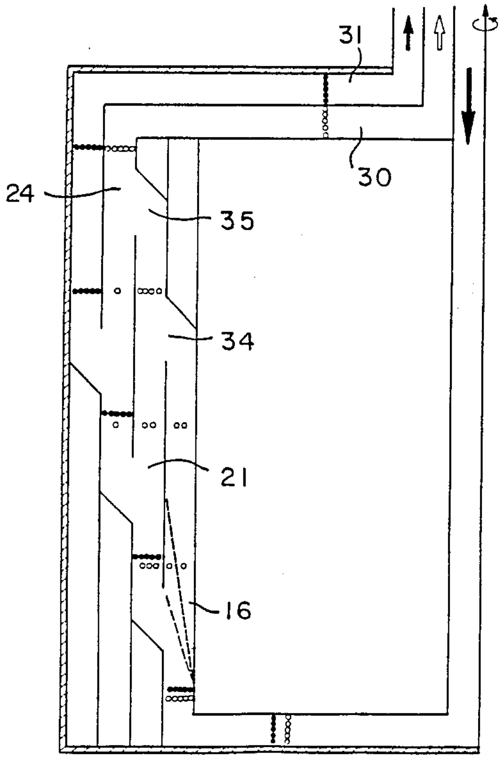
FIG. 2 shows a diagrammatic view of a portion of an alternative embodiment of a centrifuge device in accordance with the invention.

FIG. 2 shows a modification of the embodiment depicted in FIG. 1 wherein the particles in channel 16 are merged with the particles in channel 21 via a further downstream opening 34 and the particles in channel 21 are thereupon further merged with the particles in channel 24 via a further downstream opening 35 prior to flowing into channel 30. All of the non-diverted particles in each channel are in effect thereby collected at or near the end of channel 24 for supply to outflow channel 30.

Figure 3:
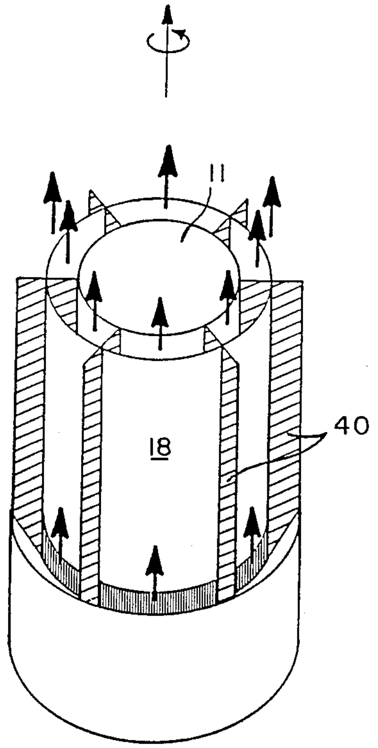
FIG. 3 shows a perspective view of a portion of an alternative embodiment of the centrifuge device of FIG. 1.

FIG. 3 shows a perspective view of a variation of the embodiment depicted in FIG. 1, illustrating, for simplification, only the structure of the inner channels 16 and 21. The channels are here supported and effectively divided into compartments by the use of radial separator elements 40 arranged to be effectively perpendicular to the surfaces of the cylinder 11 and the cylindrical shells, or channel walls so as to prevent circumferential motion of the particle streams. If in some applications circumferential motion is more desirable, the radial support barriers can be replaced by a plurality of small spacers/support members between adjacent channel walls.

Figure 4:
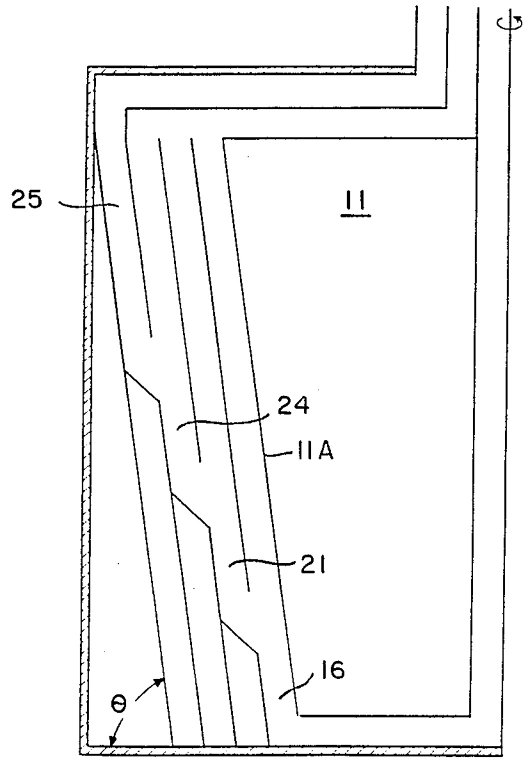
FIG. 4 shows a diagrammatic view of a portion of another alternative embodiment of a centrifuge device in accordance with the invention.

FIG. 4 shows an alternative embodiment of the invention in which the cylinder 11 is configured in a fustro-conical shape so that the channels 16, 21, 24 and 25, which are parallel to the outer wall 11A thereof, are positioned at a selected angle with reference to the vertical axis of rotation of cylinder 11. Such a structure could prove useful in removing any sediment sludge which may be present in the fluid in some cases.

Figure 5:
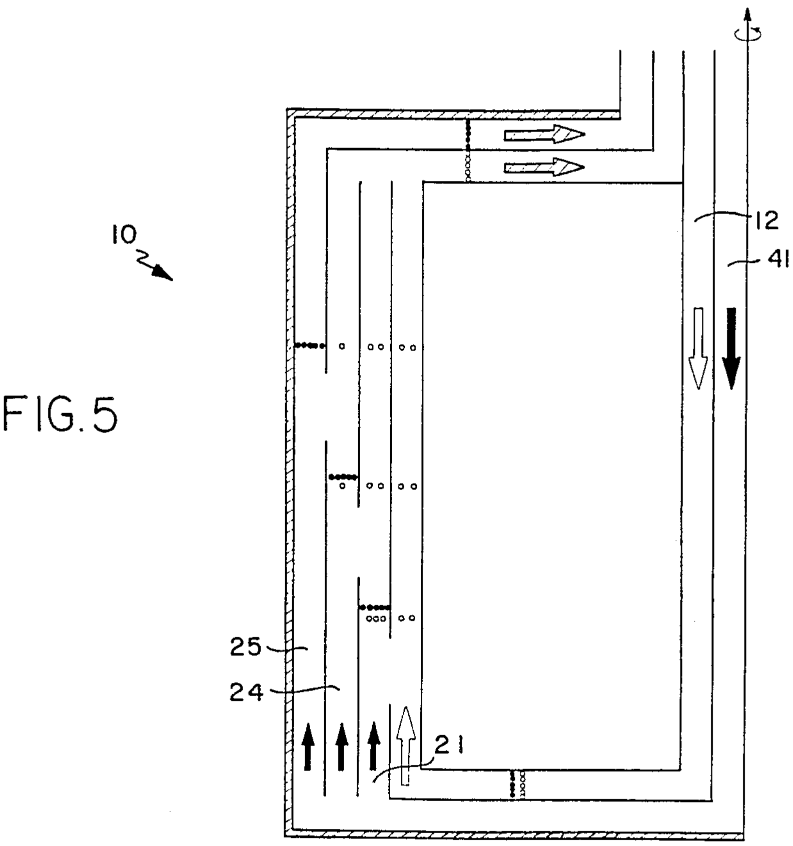
FIG. 5 shows a diagrammatic view of a portion of another alternative embodiment of the invention utilizing both a feed fluid input and a wash fluid input.

FIG. 5 shows still a further alternative embodiment of the invention in which the outer channels 21, 24 and 25 are supplied with a wash fluid which is introduced through a center channel 41 adjacent and parallel to the inflow fluid feed channel 12. The wash fluid acts as a further control which allows particles to separate/fractionate without much diversion of the continuous fluid phase. The presence of wash fluid in the outer channels permits the particle diversion desired while as little as possible of the original fluid medium is diverted into the next adjacent channel in each case.

Figure 6:
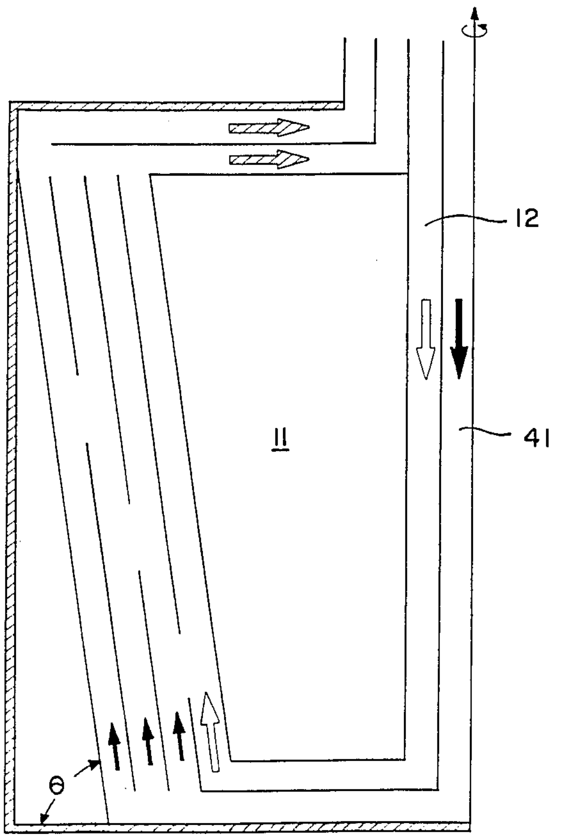
FIG. 6 shows a diagrammatic view of a portion of still another alternative of a centrifuge device in accordance with the invention using both a feed fluid input and a wash fluid input.

FIG. 6 shows a still further alternative embodiment of the wash fluid drive approach of FIG. 5 wherein the channels are again positioned at an angle J with respect to axis of rotation of a fustro-conical shaped cylinder 11, as in FIG. 4.

Fo simplicity the particles and their flow direction arrows, as well as many of the reference numerals depicted in FIG. 1, are sometimes omitted from FIGS. 2–6.

The flow rates, the channel lengths and the positions of the openings between adjacent channels can be determined for any particle separation operation once the particle species and their sedimentation rates are known for a particular centrifugal field and such factors can be readily determined by those in the art in the design and operation of a particular embodiment of the invention.

Moreover, the designs heretofore illustrated and described can be extended for use in the simultaneous separation and fractionation of several different particle species, i.e. more than two species and for particles that are both heavier and lighter than the fluid phase. The principles of operation are substantially the same and the points at which the different particle species can be appropriately collected can be readily determined.

Other modifications of the invention may occur to those in the art within the spirit and scope of the invention and the invention is not to be considered a restricted only to the specific embodiments shown and discussed above. Hence, the invention is not to be construed a limited to the specific embodiments disclosed, except as defined by the appended claims.

What is claimed is:

1. A centrifuge device for separating and fractionating particles of at least two different species contained in a fluid medium, said device comprising high speed rotation means for producing a centrifugal field;

a plurality of channel means successively positioned adjacent to one another in said centrifugal field to form an internal cascade;

means for causing said fluid medium containing said different particle species to flow continuously into said centrifugal field through said plurality of channel means;

said channel means being arranged so that portions of the fluid medium containing substantially all of the particles of one of said species and a fraction of the particles of the another of said species are successively diverted from one channel means to a next adjacent channel means, the remaining portions of said fluid medium containing substantially only particles of said another specie continuing to flow in said one channel means; and at least two output means responsive to said channel means for separately supplying, respectively, a continuous flow of a portion of fluid medium containing substantially all of the particles of said one species and a portion of a fluid medium containing substantially all of the particles of said another species.

2. A centrifuge device in accordance with claim 1 for separating and fractionating particles of more than two different species wherein said plurality of channel means are arranged as said internal cascade so that substantially all of the particles of each of said different species are successively diverted and said device includes a plurality of different output means responsive to said channel means for separately supplying, respectively, continuous flows of substantially all of the particles of each of said different species.

3. A centrifuge device in accordance with claim 1 for separating particles of two different species, wherein said plurality of channel means are arranged as said internal cascade so that substantially all of the particles of one of said species flows in one of said channel means and substantially all of the particles of the other of said species flow in the other ones of said plurality of channel means; and further wherein said device includes two output means one of which supplies a continuous flow of particles of said one species and the other of which responds to the continuous flow of particles in the others of said channel means to supply a continuous flow of particles of said other species.

4. A centrifuge device in accordance with claim 1 and further including means for introducing a wash fluid into selected ones of said plurality of channel means for controlling the flow of said fluid medium in said selected channel means.

5. A centrifuge device in accordance with claim 1 wherein said centrifugal field producing means comprises a high speed cylindrical rotating means, said plurality of channel means being formed as a plurality of concentric channels positioned adjacent to one another about, and substantially parallel with, the outer surface of said cylindrical rotating means; and a pluralty of openings each positioned, respectively, between adjacent ones of said channel means to form said internal cascade and to provide for the successive diversions of said portions of said fluid medium from one channel means to the next adjacent channel means.

6. A centrifuge device in accordance with claim 1 wherein said centrifugal field producing means is a high speed frusto-conically shaped rotating means, said plurality of concentric channel means being positioned adjacent each other about, and substantially parallel with, the outer surface of said frusto-conically shaped rotating means.

7. A centrifuge device in accordance with claim 1 wherein said device is hermetically sealed.

8. A centrifuge device in accordance with claim 5 wherein said concentric channels are formed by concentric shells supported by separating elements positioned at selected locations between said concentric channel shells.

9. A centrifuge device in accordance with claim 8 wherein said separating elements are formed as a plurality of partitions extending between the channel shells substantially perpendicular thereto and to the outer wall of said cylindrical rotating means to support said concentric shells and to generally prevent circumferential motions of said fluid means flowing in said channel means.

* * * * *